United States Patent [19]

Instone et al.

[11] Patent Number: 5,109,999
[45] Date of Patent: May 5, 1992

[54] TRANSPORT CONTAINERS

[75] Inventors: Jeremy Instone; Giles Instone, both of London, England

[73] Assignee: Solindo Equipment Leasing Limited, Crawley, England

[21] Appl. No.: 576,523

[22] PCT Filed: Feb. 7, 1990

[86] PCT No.: PCT/GB90/00196
§ 371 Date: Oct. 5, 1990
§ 102(e) Date: Oct. 5, 1990

[87] PCT Pub. No.: WO90/09098
PCT Pub. Date: Aug. 23, 1990

[30] Foreign Application Priority Data

Feb. 7, 1989 [GB] United Kingdom ............. 8902632

[51] Int. Cl.⁵ .............................................. B65G 1/20
[52] U.S. Cl. ........................................ 220/1.5; 220/6
[58] Field of Search ................. 220/6, 1.5, 4.28, 8

[56] References Cited

U.S. PATENT DOCUMENTS

| | | | |
|---|---|---|---|
| 2,922,517 | 1/1960 | Nordquist et al. | 220/1.5 X |
| 3,044,653 | 7/1962 | Tantlinger | 220/1.5 |
| 3,145,834 | 8/1964 | Hillger et al. | 220/1.5 X |
| 3,294,034 | 12/1966 | Bodenheimer et al. | 220/1.5 X |
| 3,382,998 | 5/1968 | Turpen | 220/1.5 |
| 3,664,539 | 5/1972 | Shahani | 220/1.5 X |
| 4,151,925 | 5/1979 | Glassmeyer | 220/1.5 |
| 4,854,460 | 8/1989 | Josephs | 220/1.5 |
| 4,860,913 | 8/1989 | Bertolini | 220/1.5 |

Primary Examiner—Steven M. Pollard
Attorney, Agent, or Firm—Pollock, Vande Sande & Priddy

[57] ABSTRACT

A container for use in the transportation of large live animals, for example horses, and which can be converted into a general freight container. The container comprises a lower part having a base and outer walls and an upper part defined by a collapsible structure. The collapsible structure comprises plural inverted U-shaped supporting members pivotally mounted to the walls, and supporting flaps which support the supporting members to provide rigidity. A canopy extends over the supporting members and is connected at its edges to at least some of the walls.

9 Claims, 3 Drawing Sheets

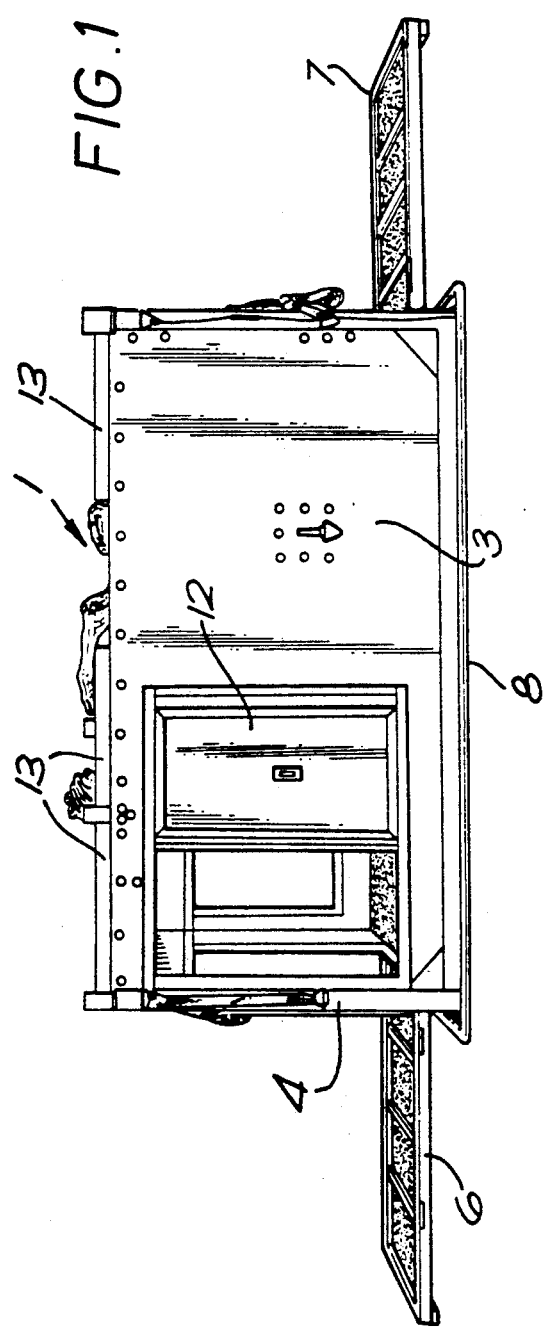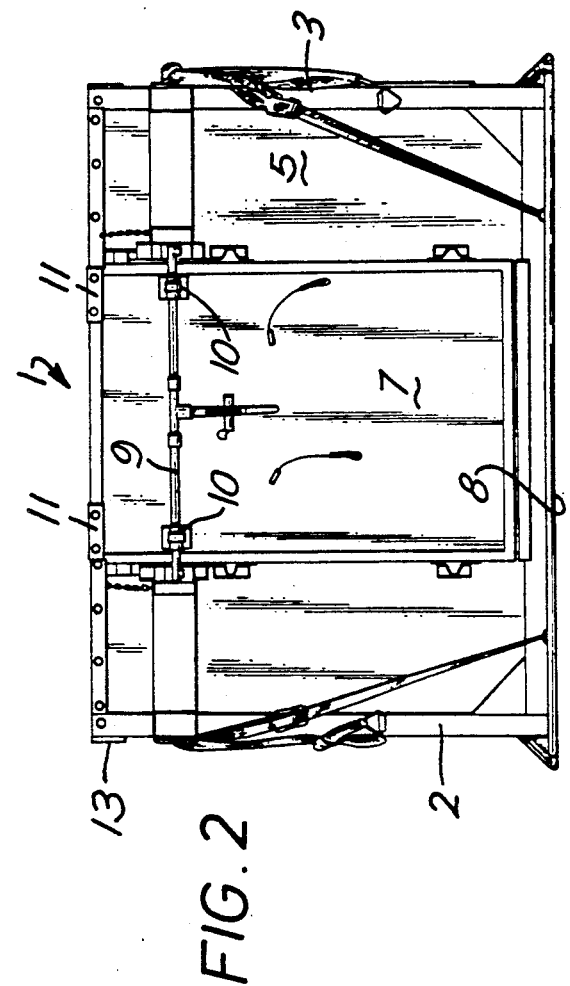

TRANSPORT CONTAINERS

FIELD OF THE INVENTION

The invention relates generally to transport containers and more specifically, although not exclusively, to transport containers for use for conveying horses or similarly sized live animals.

BACKGROUND OF THE INVENTION

Transportation of horses by air is commonplace because of the need to transfer the animals between studs for breeding purposes, for example. Great care must be taken during the transportation of bloodstock because of the high value of the animals, and a number of containers have been proposed to meet the special needs associated with the transportation of horses and other similarly sized valuable animals by air.

For example, applicants' U.S. Pat. No. 4,566,404 discloses a conveyance suitable for the transportation of livestock (particularly horses) by air, and comprising a generally rectangular box-like enclosure having one wall hingedly connected to the floor of the enclosure to provide a ramp for off-loading horses from the enclosure and another wall including a central portion hinged to the floor which can be utilized for loading horses into the enclosure. Both the wall and the wall portion include means for locking them in an upright position. Inside the enclosure a number of demountable partitions are provided for use in defining a number of separate compartments, and these partitions can be stored adjacent the side walls of the enclosure to enable the enclosure to be used as a general air freight container when horses are not being transported.

Thus, our previously proposed container can be utilized in one flight direction, e.g., an outward journey, as a horse box for the transportation of horses and in another flight direction, e.g., the homeward journey, as a general freight container for transporting freight other than livestock when there are no horses requiring transportation.

The transport of an empty container will still involve expense, because the cost of carrying a container is calculated by the airline on the basis of both the size and weight of the container, and the above discussed container offers the advantage that even when there are no horses to be transported the container can be used to generate income for its owner by carrying other goods. However, while it is the aim of most freight transport operators to run a profitable organization by using their containers to transport goods on every journey and never to fly an empty container, there are sometimes circumstances beyond the operator's control which necessitate the movement of empty containers despite the expense involved. Under these circumstances, it would be desirable to be able to reduce the size of the container so that, for example, it could be flown in a smaller aircraft or in a more confined part of the aircraft in order to minimize transportation costs.

SUMMARY OF THE INVENTION

The present invention aims to mitigate the above-mentioned and associated problems by providing a container which is primarily adapted for use in the transportation of horses or other like-sized live animals, but which can be converted into a general freight container by removal or re-arrangement of parts within the container, and which can be reduced in size by collapsing a collapsible structure of the container.

In an embodiment to be described in greater detail hereinafter, the collapsible structure is the superstructure of the container and comprises a plurality of substantially U-shaped supporting members mounted at the upper portions of the walls of the container and a canopy extending over the supporting members with edge portions of the canopy secured to the upper portions of at least some of the walls of the container.

Preferably, the U-shaped supporting members are pivotally mounted to the said upper portions to facilitate lowering of the roof superstructure, for example when the increased height of the container provided by the superstructure is not required.

The U-shaped supporting members are preferably arranged to be held in an upright position when the increased height provided by the superstructure is required, by means of rigid supporting flaps hinged at portions of the upper edges of at least some of the side walls of the container, such supporting flaps extending between the supporting members and being releasably engageable therewith to provide rigidity to the roof superstructure.

Preferably, the supporting flaps are releasably engaged with the supporting members by way of biased locking pins which engage with pin receiving apertures in the supporting members.

In order to reduce sagging of the canopy, which is preferably made of a flexible material or fabric such as canvas, a plurality of supporting members such as cables or other elongate flexible members advantageously run across the tops of the supporting members and perpendicular hereto along the length of the container.

The container is particularly suited to being adapted for use as a stable for conveying animals such as horses. Each end of the container may include a hinged portion which can be lowered to provide a ramp upon which horses can be led into and from the container. The horses can be led into any one of a number of compartments defined by demountable partitions within the container.

Preferably, the demountable partitions are held in position by elongate members adapted to engage with apertures in the floor of the container and channels or further apertures in at least some of the U-shaped supporting members. A groom's compartment can also be defined by demountable partitions within the container.

In order to enable the groom to gain access to the inside of the container when the container is in transit, at least one side wall is advantageously provided with a sliding entry door; within the confines of a freight carrying aircraft it is likely that there will be insufficient room to enable the hinged portions of the ends of the container to be lowered to provide access for the groom.

BRIEF DESCRIPTION OF THE DRAWINGS

In order that the invention may be well understood, an exemplary embodiment thereof will be described hereinbelow with reference to the accompanying drawings, in which:

FIG. 1 is a side view of a transport container with the canopy lowered;

FIG. 2 is an end view of the transport container of FIG. 1;

DESCRIPTION OF PREFERRED EMBODIMENT

Figure 3:
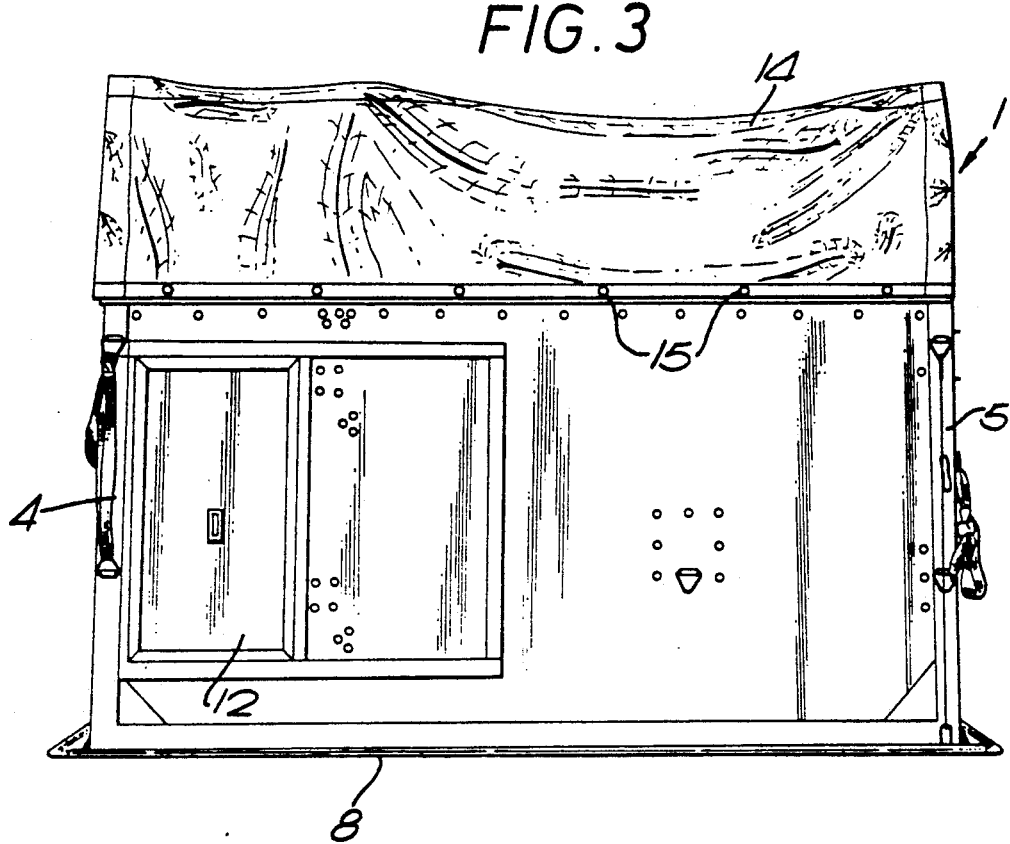
FIG. 3 is a side view of the container with the canopy raised.

Referring first to FIGS. 1 and 2 of the drawings, the container 1 has two side walls 2,3 and two end walls 4,5 which, for the sake of convenience, will hereinafter be referred to as the front wall 4 and the rear wall 5. Both the front wall 4 and the rear wall 5 include central portions 6,7 hinged along their respective bottom edges to the base 8 of the container which portions can be lowered to form ramps as shown in FIG. 1 to permit access to the container or can be fully raised to close the container. When used to carry horses, the hinged portion 7 can be lowered to provide an entry route for the horses and the hinged portion 6 can be lowered to provide an exit route for the horses. As can be seen in FIG. 2, the hinged portion 7 (and the hinged portion 6) is adapted to be locked in the raised position by way of a retaining member 9 which extends across the hinged portion into engagement with latch members 10 on the non-hinged portions of the rear wall 5. When the hinged portion is lowered to form a ramp, the retaining member 9 is protected from damage by the provision of spacers 11 which support the extreme end of the ramp to space the ramp from the ground.

The side walls 2,3 each include a sliding groom door 12 towards the front of the container, which door 12 allows the groom to enter and leave the container without using the ramps. Thus, the groom may watch over and tend to the needs of his/her charges during the flight. As will be explained in greater detail hereinafter, the container includes demountable partitions which can be used to define separate horse compartments and a groom's compartment, the groom's compartment normally being located towards the front of the container to enable him to gain entry thereto via one of the sliding doors.

Figure 4:
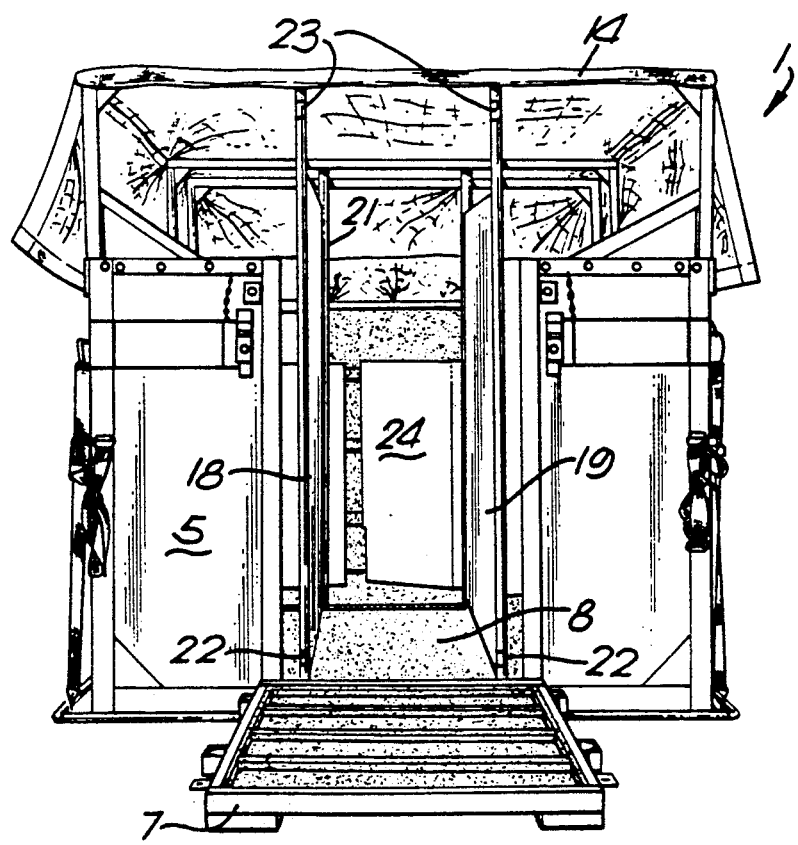
FIG. 4 is an end view of the container with the canopy raised and an access ramp lowered.

The side walls 2,3 and the front and rear walls 4,5 are all of substantially the same height and, as can be seen in FIG. 1, but is best seen in FIG. 4, U-shaped canopy supports, or support hoops 13, are provided at intervals along the upper edges of the side walls 2,3. The support hoops 13 are pivotally mounted to the edges of the side walls 2,3 so that, as can be seen in FIG. 1, when the container is not being used to transport horses the hoops 13 can be lowered to lie flat against the top edges of the side walls 2,3 and, as can be seen in FIGS. 3 and 4, when the container is to be used for transporting horses, the hoops 13 can be raised to support a canopy 14 which acts as a roof for the container. Edge portions of the canopy 14 are secured to the associated wall portions by way of any suitable securing means 15, such as toggle catches. FIG. 3 also shows the sliding groom door 12 in the closed position.

As can be seen in FIG. 4, the hoops 13 and canopy 14 provide a roof superstructure which increases the height of the container when the hoops 13 are locked in the vertical position and which can be lowered to reduce the overall height of the container when the container is not being used to transport horses. Plastic coated wires or other suitable flexible cables, extending from the front of the container to the rear of the container and over the tops of all the hoops positioned therebetween, provide additional support to the canopy to prevent the canopy from sagging between the hoops. The cables also provide a degree of support between the support hoops to limit movement of the hoops during transit of the container. The canopy can be made of any suitable material, for example canvas, and is preferably permanently attached to the hoops to rest over the top of the hoops when the roof superstructure is lowered. When the roof superstructure is raised, as shown for example in FIGS. 3 and 4, the overall height of the container is typically such that the container will fit in the upper deck of a cargo carrying Boeing 747 jet airliner, for example, and when the roof superstructure is lowered, the height of the container is reduced, to enable it to be stored in the lower deck of the same aircraft. Since the overall size of the container can be reduced the cost of transporting the container will be reduced accordingly whether or not the container is being used to transport goods other than horses.

Figure 5:
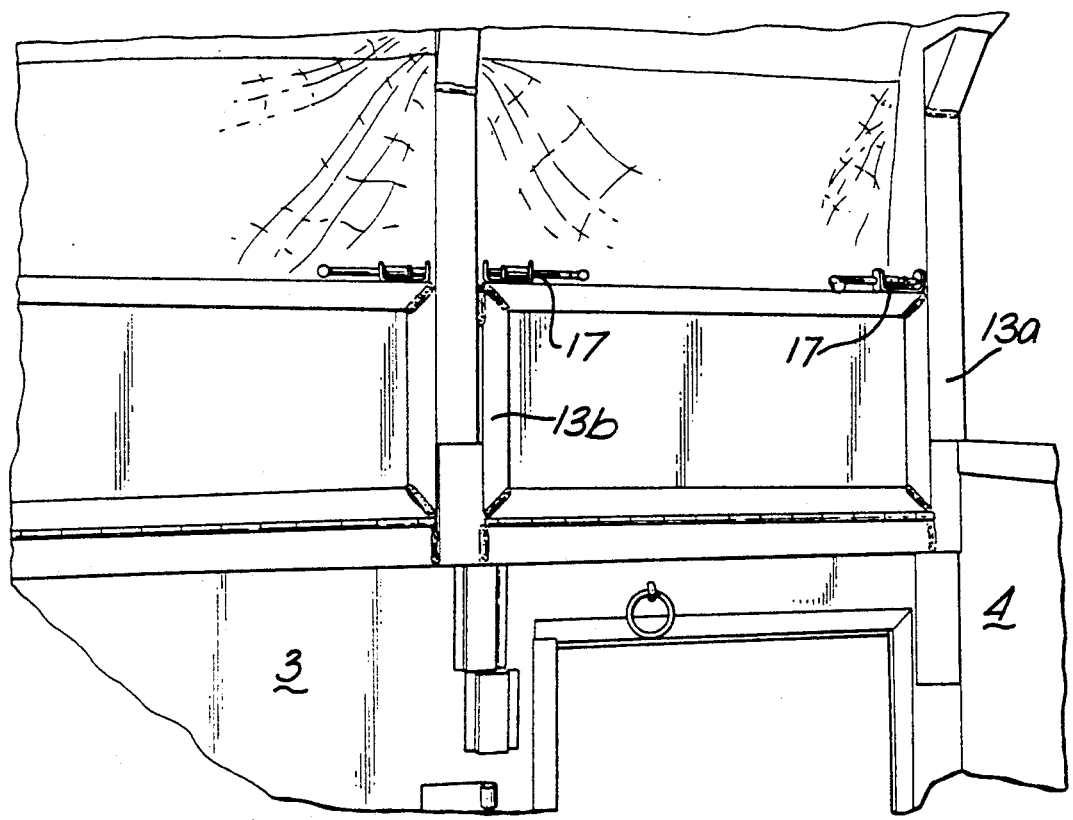
FIG. 5 is an interior part view showing a canopy support retaining flap in a locked position.

In order to support the hoops 13 in the upright position, support flaps 16 are pivotally provided at the upper edges of the side walls 2,3 between the hoops 13. Each of the support flaps is hinged to its respective upper edge of a side wall 2,3 and can be pivoted into a vertical position extending between consecutive hoops 13a, 13b as shown in FIG. 5. Spring biased locking pins 17 are provided on the support flap 16 for engagement with pre-formed holes in the hoops 13a,13b to hold the flap in the vertical position, thereby to provide support for the hoops 13a,13b.

Figure 6:
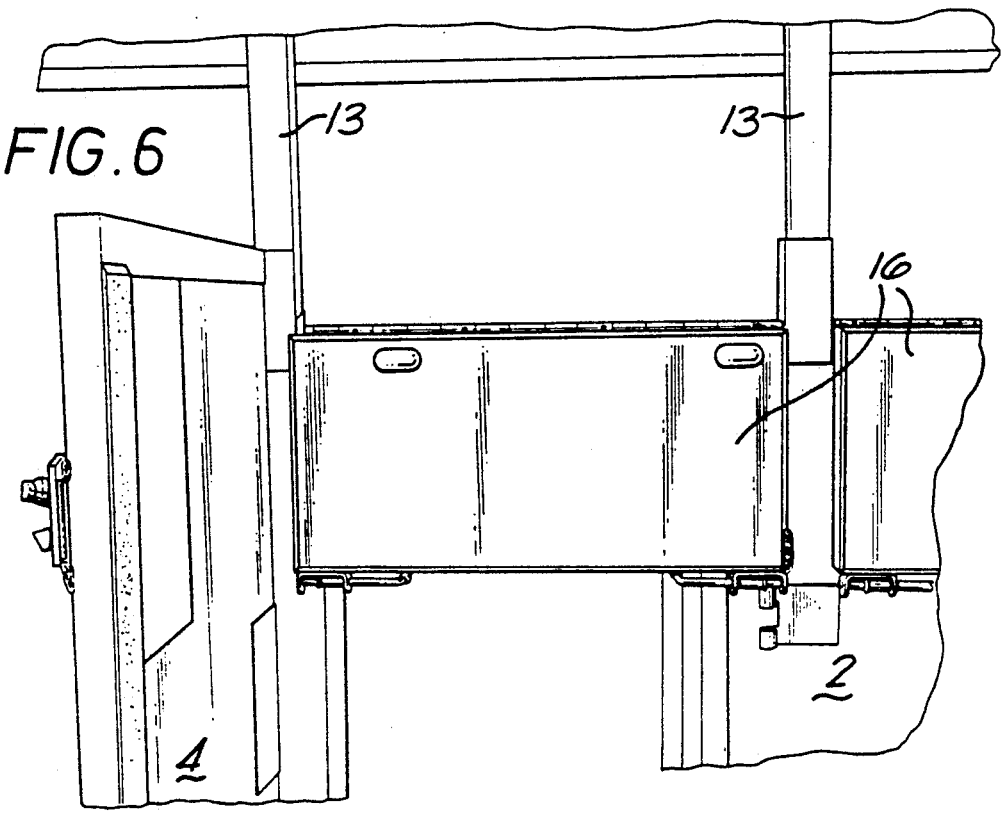
FIG. 6 is an interior part view showing a canopy support retaining flap in an unlocked position.

As can be seen in FIG. 6, each of the flaps 16 can be released from between the hoops and pivoted to hang parallel to the side walls 2,3 below or in line with the uppermost edges of the side walls 2,3. With the flaps 16 in this hanging position, the hoops 13 are free to be pivoted about their pivotal mountings to lie on top of and parallel to the uppermost edges of the walls.

Returning again to FIG. 4, when in use as a horsebox the inside of the container can, as already mentioned, be divided into separate horse compartments, one for each horse, and a compartment for the groom. The compartments are formed by rigid demountable partitions 18,19 which extend from the base 8 of the container to an appropriate height for the horses. Each partition is held in position by elongate supports 21 which include spring biased portions 22,23 at respective ends of the support. The lower spring biased portion 22 cooperates with an aperture in the base 8 and the upper spring biassed portion 23 cooperates with a channel in the appropriate hoop 13 to hold the elongate support and hence the partition in the desired position within the container. Several such apertures may be provided in the base to enable the container to be partitioned in a variety of different ways to accommodate different sizes or numbers of horses. A further partition 24 is provided and secured in the container in a similar way to that just described to separate the groom's compartment at the front of the container from the individual horse compartments. The partition 24 can be provided with doors to access individually each of the horse compartments.

The biased portions 23 of the elongate supports 21 are partially retractable for the purpose of releasing the supports from the respective apertures and channels.

When horses are to be led into the container, the elongate support 21 nearest to the rear wall can be disengaged from its respective aperture and channel, so that the respective partition can be pivoted about the other support 22 to increase the size of the entrance into a side horse compartment. With the ramp in the position shown in FIG. 4, for example, the horse can be led up the ramp into the compartment and the partition can then be returned to its normal position. Further horses may be brought into the container in a similar manner.

The horses are generally unloaded in a similar manner via the front ramp 6; this avoids the problem of the horses having to be backed out of the container.

When the container is not being used to transport horses, the partitions can be demounted and placed on the floor or against a side wall of the container to enable other freight to be carried in the container. The container is readily adaptable to carry either horses or other freight, and the height of the container can be adjusted to suit the requirements of the load being carried simply by raising or lowering the roof superstructure.

The invention has been described in relation to a preferred embodiment; modifications and variations will be apparent to those of ordinary skill in the art. For example, whereas in the described embodiment the container, in effect, has a roof constituted by support hoops covered in canvas and adapted to be folded down, in an alternative construction the container roof could be solid and supported, for example, at the four corners of the container by means of supports which can be dropped down into the container, thereby lowering the height of the roof.

We claim:

1. A transport container comprising a lower part having a base and outer walls and an upper part defined by a collapsible structure which comprises a plurality of supporting members adjustably mounted to upper portions of said outer walls to be selectively raised and lowered relative to said outer walls, and a canopy extending over said supporting members and having edge portions which are adapted to be secured to said upper portions of at least some of said outer walls, said upper portions of at least some of said outer walls being hingedly provided with rigid supporting flaps which are arranged to be releasably engageable with said supporting members to provide stability to the collapsible structure when raised.

2. A transport container according to claim 1, wherein said supporting members are pivotally mounted to said upper portions of said outer walls.

3. A transport container according to claim 2, wherein the said supporting flaps are arranged to engage with said supporting members by way of biassed locking pins which co-operate with pin received apertures in said supporting members.

4. A transport container according to claim 1, wherein said canopy is made of a flexible material.

5. A transport container according to claim 4, wherein said flexible material is canvas.

6. A transport container according to claim 5, further comprising a plurality of elongate flexible supporting members which extend perpendicularly across the tops of said supporting members to provide further support to said canopy.

7. A transport container according to claim 4, wherein said supporting members comprise inverted substantially U-shaped support hoops over which said flexible material of the canopy is supported.

8. A transport container according to claim 1, wherein said supporting members are slidably mounted to said upper portions of said outer walls.

9. A transport container according to claim 1 or claim 6, wherein said canopy is made from a rigid material.

* * * * *